United States Patent [19]
Buell

[11] Patent Number: 5,768,079
[45] Date of Patent: Jun. 16, 1998

[54] ADAPTIVE GROUND AND PHASE FAULT DETECTION FOR A POWER DISTRIBUTION SYSTEM

[75] Inventor: Richard Ralph Buell, South Milwaukee, Wis.

[73] Assignee: Cooper Industries, Inc., Houston, Tex.

[21] Appl. No.: 721,767

[22] Filed: Sep. 25, 1996

[51] Int. Cl.⁶ ............................ H02H 3/26
[52] U.S. Cl. .............. 361/78; 361/76; 364/483; 364/492
[58] Field of Search ............... 361/78, 87, 85, 361/93, 76; 364/480, 481, 483, 492

[56] References Cited

U.S. PATENT DOCUMENTS

| | | | |
|---|---|---|---|
| 3,723,814 | 3/1973 | Gross | 361/45 |
| 4,091,433 | 5/1978 | Wilkinson | 361/76 |
| 4,535,409 | 8/1985 | Jindrick et al. | 364/481 |
| 4,538,196 | 8/1985 | Sun et al. | 361/64 |
| 4,566,053 | 1/1986 | Strickland, Jr. | 361/42 |
| 4,631,625 | 12/1986 | Alexander et al. | 361/94 |
| 4,725,914 | 2/1988 | Garitty | 361/76 |
| 4,812,995 | 3/1989 | Girgis et al. | 364/481 |
| 4,825,327 | 4/1989 | Alexander et al. | 361/82 |
| 4,845,594 | 7/1989 | Wilkerson | 361/71 |
| 4,994,934 | 2/1991 | Bouhenguel | 361/71 |
| 4,996,646 | 2/1991 | Farrington | 364/483 |
| 5,077,627 | 12/1991 | Fraisse | 361/93 |
| 5,303,112 | 4/1994 | Zulaski | 361/67 |
| 5,357,394 | 10/1994 | Piney | 361/72 |

*Primary Examiner*—Jeffrey A. Gaffin
*Assistant Examiner*—Sally C. Medley
*Attorney, Agent, or Firm*—Burns, Doane, Swecker & Mathis, L.L.P.

[57] ABSTRACT

An adaptive method and apparatus for detecting fault conditions in a power distribution system that services both single phase loads and three phase loads. The present invention accomplishes this by providing an adaptive ground fault detection method and an adaptive phase fault detection method. Both methods provide the capability to distinguish gradual changes in phase current, due to ordinary current fluctuations, from more substantial changes in phase current due to various fault conditions. By making this distinction, the present invention minimizes unnecessary service interruptions.

18 Claims, 14 Drawing Sheets

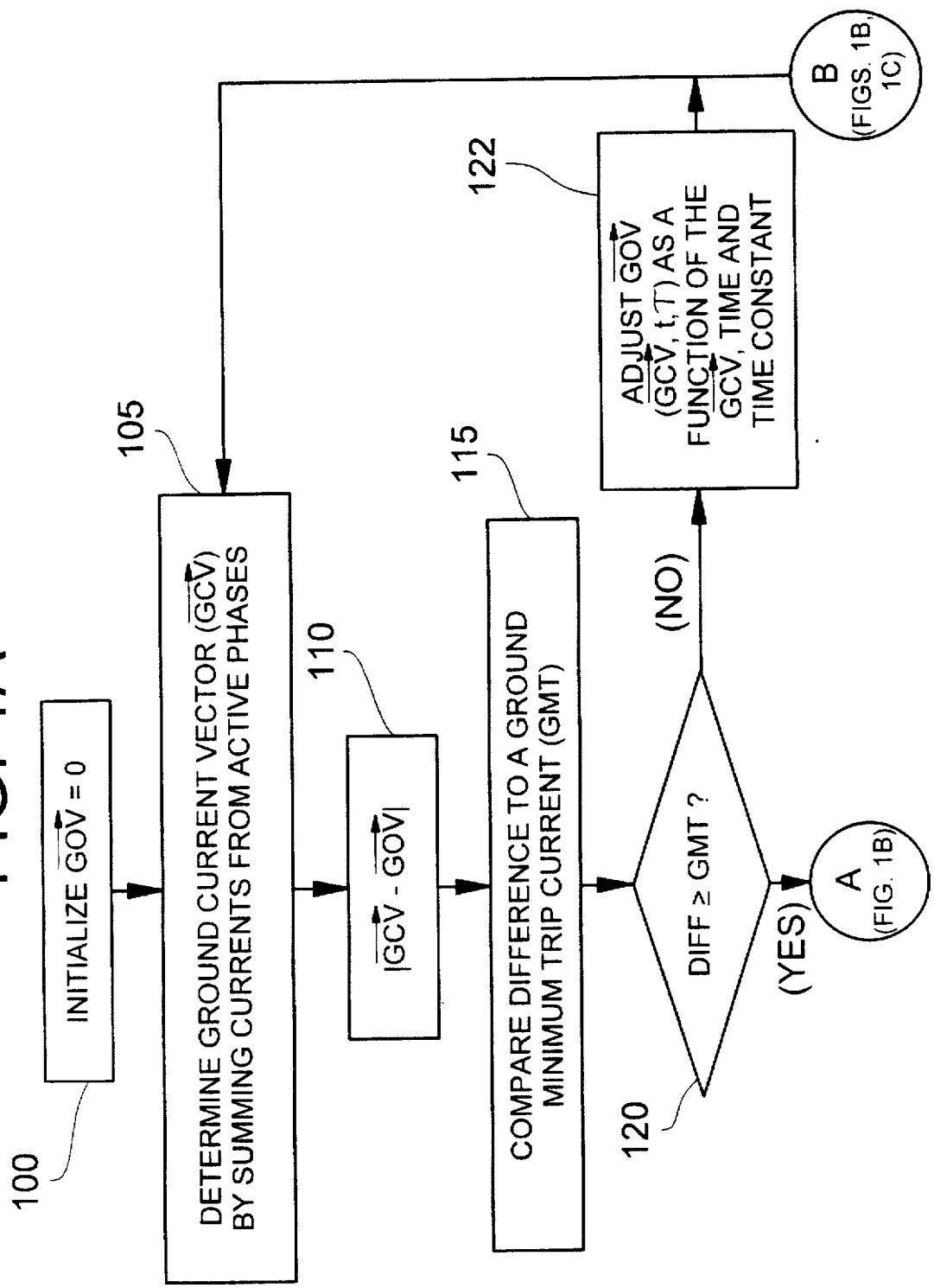

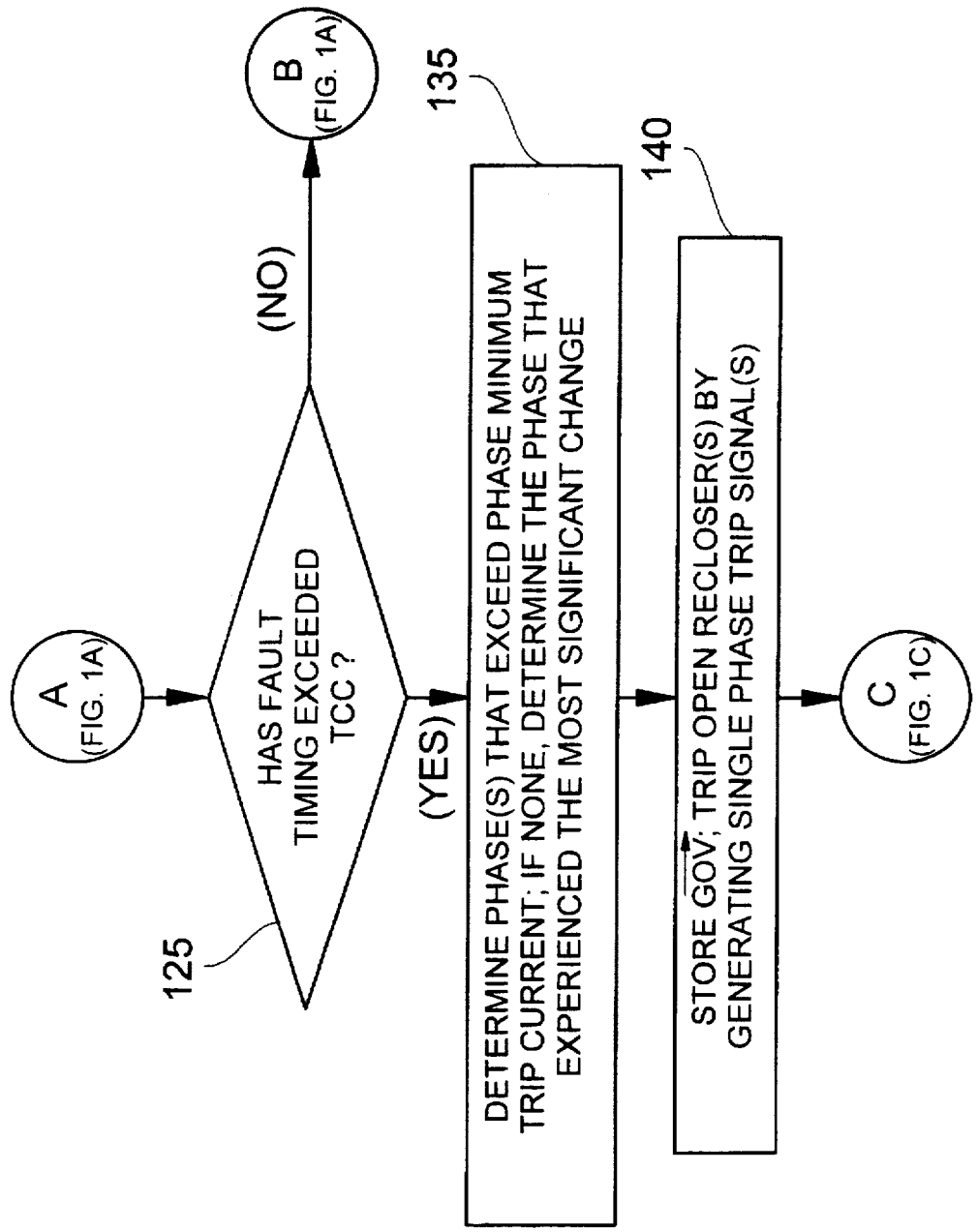

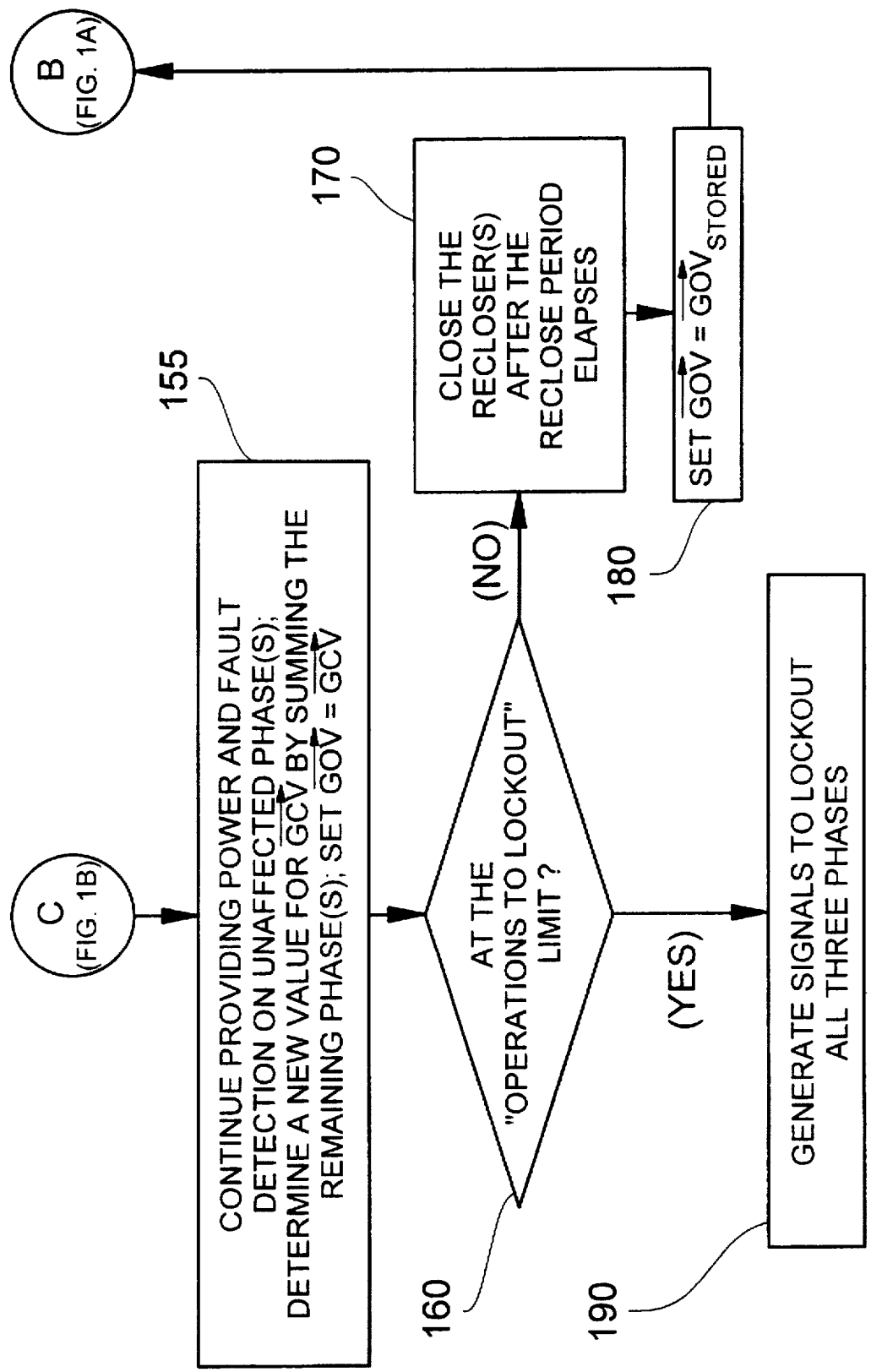

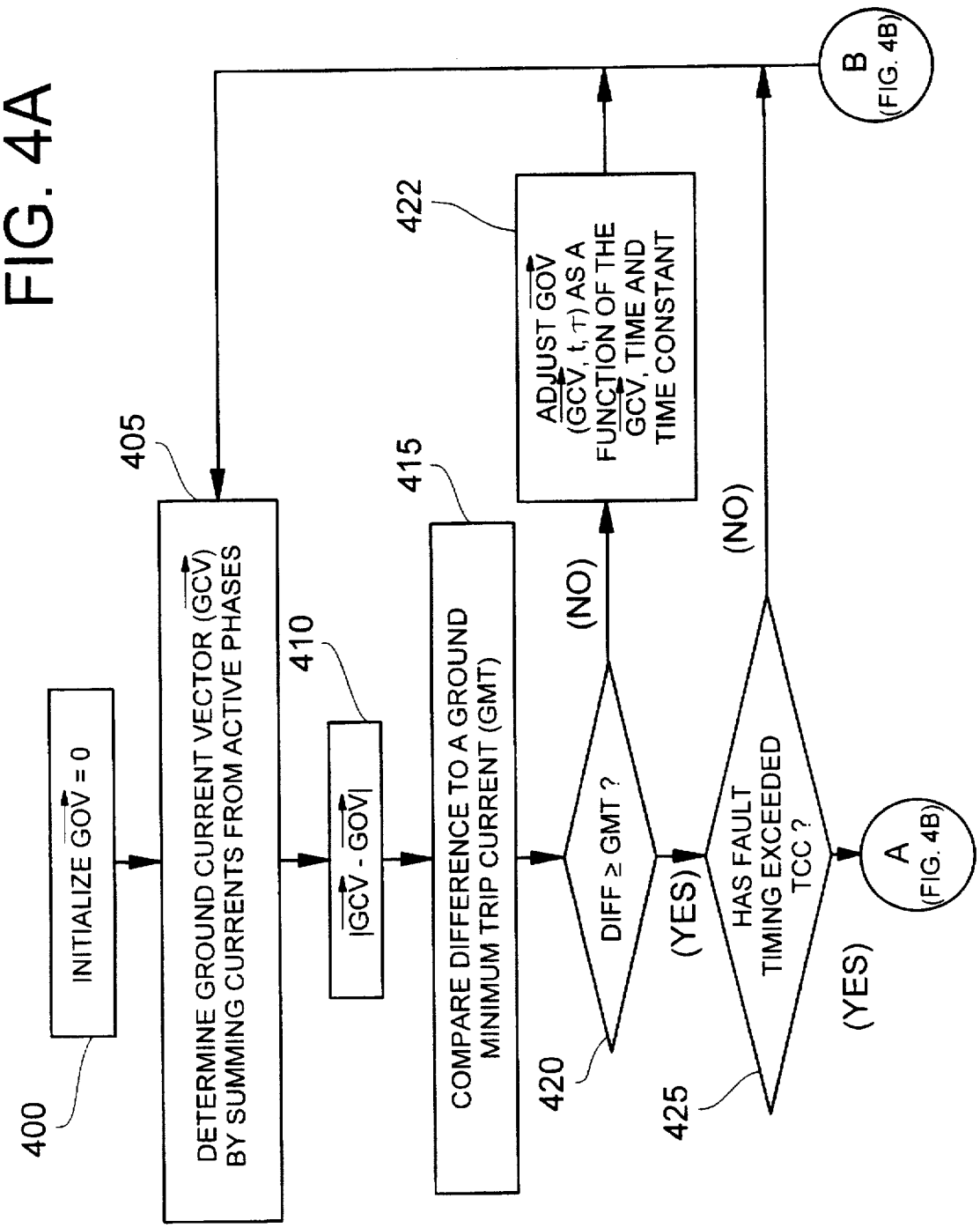

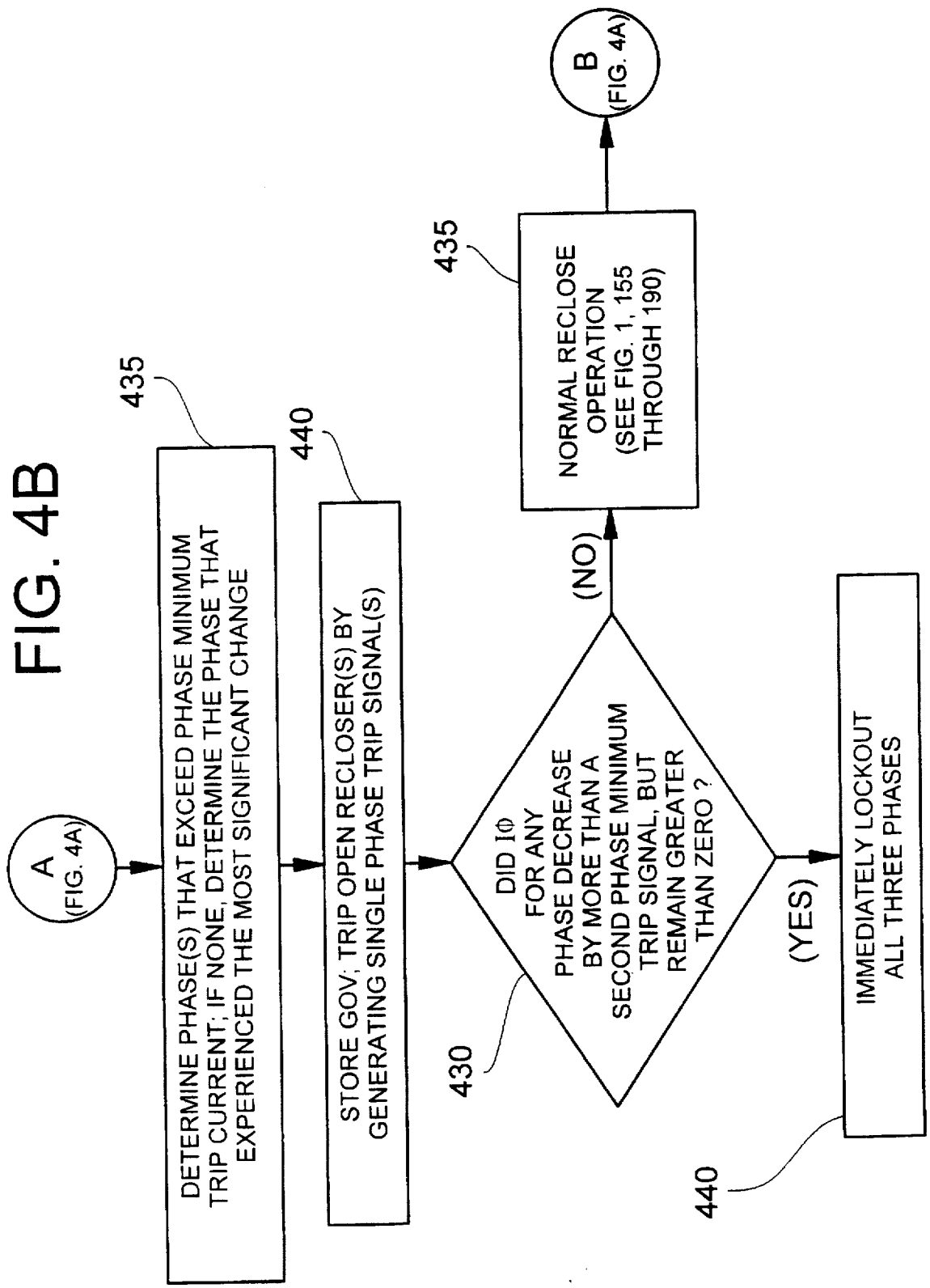

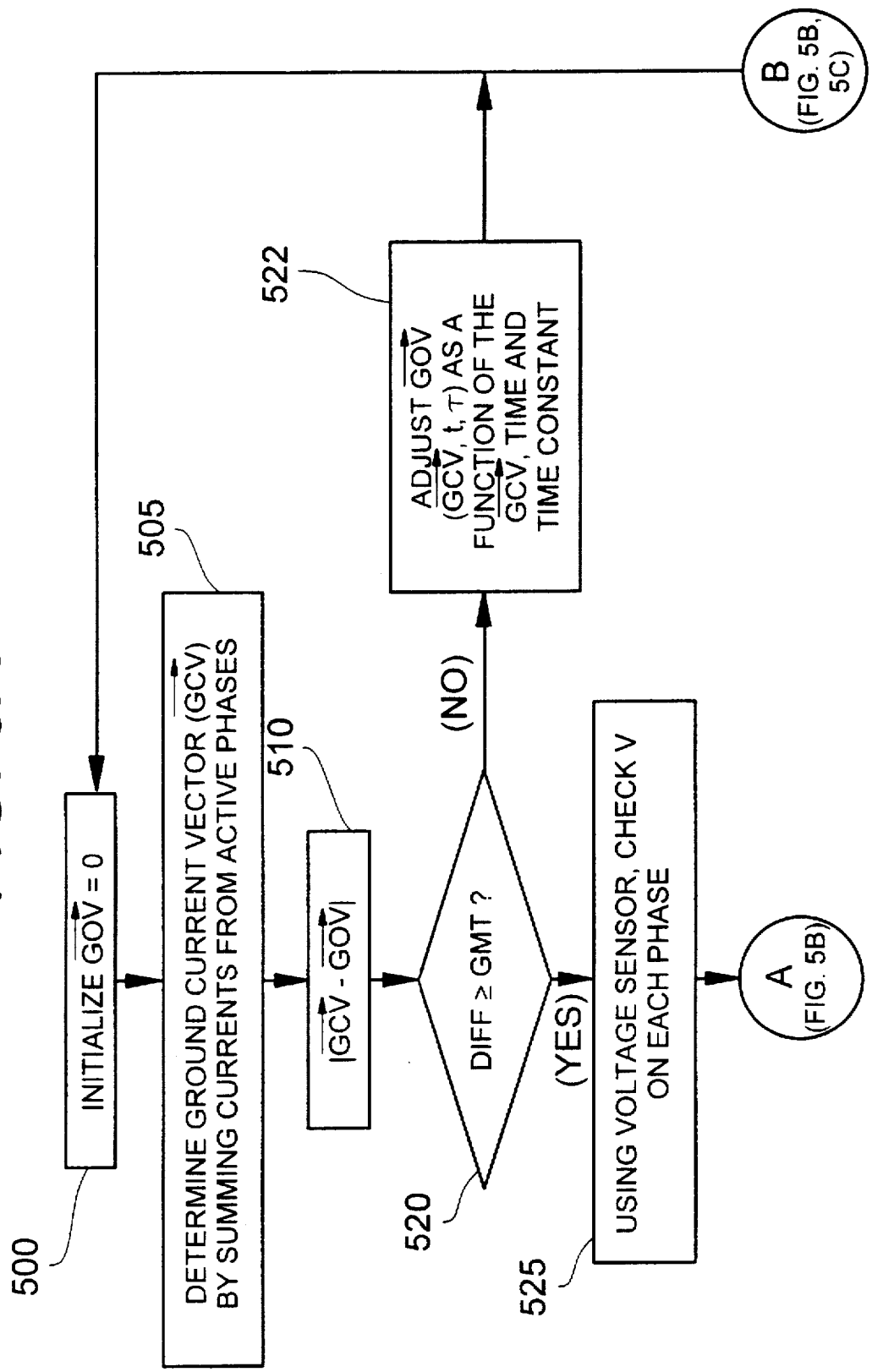

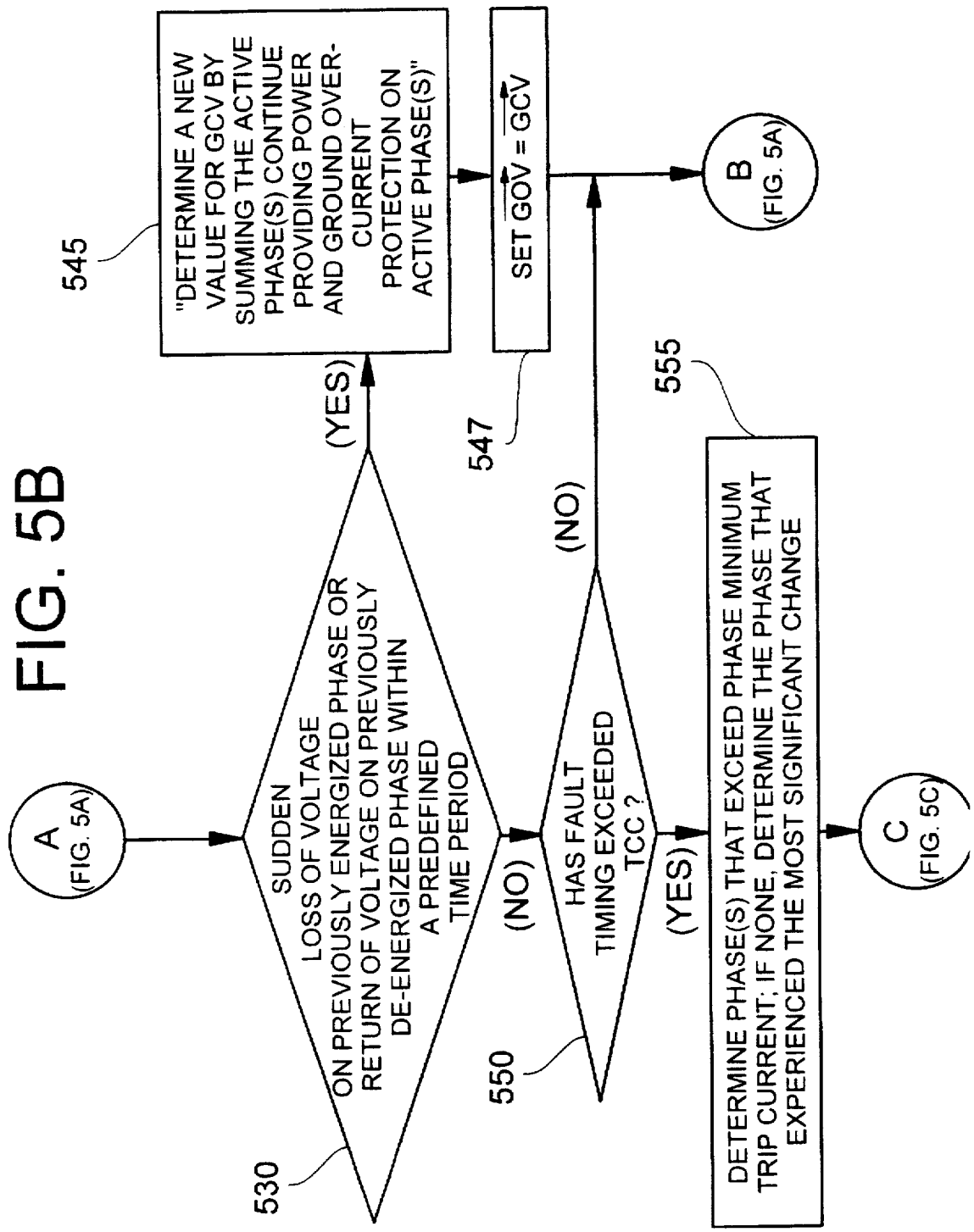

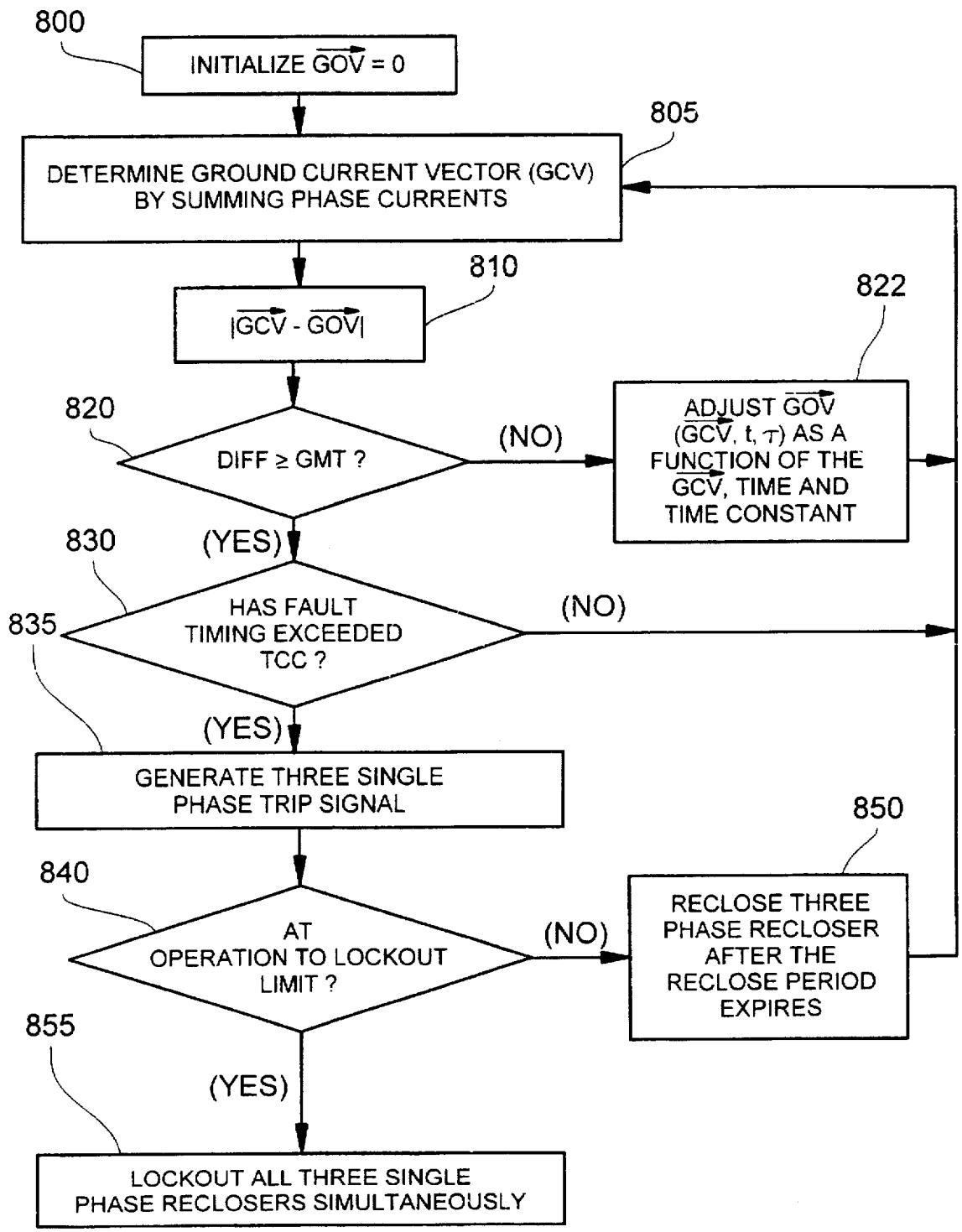

5,768,079

ADAPTIVE GROUND AND PHASE FAULT DETECTION FOR A POWER DISTRIBUTION SYSTEM

BACKGROUND

The present invention relates to the protection of power distribution systems. More particularly, the present invention relates to a method that can distinguish gradual changes in load current due to normal fluctuations from sudden changes in load current due to fault conditions so as to avoid unnecessarily interrupting service.

Three phase power distribution systems that provide both single phase and three phase power to both residential and commercial customers typically employ some mechanism for protecting the system, primarily the feeders, against various fault conditions, e.g., overcurrent conditions, and for minimizing service interruptions.

Fuses are commonly used to protect power distribution system against overcurrent conditions. Fuses are typically placed throughout the system between various power sources and electrical loads. They are designed to permanently open a circuit in response to a sufficiently high level of current. When a fuse blows, service is interrupted, and the system must re-rout the electricity around the affected fuse in order to restore service, or the fuse must be manually replaced. This process of re-routing power and/or replacing the fuse can be very time consuming, costly and likely to result in some significant interruption in service.

When an overcurrent situation arises, the above-identified problems associated with fuses can be avoided, to some extent, by employing reclosers in addition to fuses. Reclosers are electromechanical devices, similar to circuit breakers. Reclosers are distributed at one or more locations along a power line, typically upline from a fuse. When a fault condition is detected by the recloser controller, the recloser will begin to timeout. In other words, the recloser controller will trip open the recloser if the fault condition has not cleared itself during a fixed time interval, where the time interval is a function of current. Then, as the name suggests, the recloser will close, and if the fault condition has been cleared, power service will resume. If, however, the fault condition has not been cleared, the recloser controller will again trip open the recloser after a second fixed time interval. If, after a predetermined number of reclose operations, the fault condition has not been cleared, the recloser controller will permanently lockout the recloser (i.e., permanently open the circuit). The circuit then remains open until the system is repaired and/or the fault condition is eliminated.

There are microprocessor-based recloser controllers which are capable of detecting fault conditions, and, in response, capable of timing out a corresponding recloser. However, these prior designs are not adaptive. Instead, fault detection in these prior designs is a function of some absolute (i.e., a fixed), preprogrammed current level, such that gradual changes in load current due to normal, daily and/or seasonal fluctuations are not taken into consideration. Therefore, service may be unnecessarily interrupted when the current fluctuation does not pose a threat to the system. Moreover, fault detection schemes based on an absolute current level may not always detect remote faults (i.e., faults that occur along a distal portion of a powerline with respect to the position of the recloser).

Presently, there are three-phase recloser controllers which provide simultaneous, three-phase reclose operations for a three-phase recloser. Unfortunately, if it becomes necessary to trip open and/or lockout a single phase, all customers will experience an interruption in service, even those connected to the unaffected phases. In addition, there are controllers which provide single-phase reclose operations for a single-phase recloser. However, Applicant is not aware of any universal controllers capable of providing reclose operations for either one, two or three phases in a three phase power distribution system nor capable of providing adaptive ground and/or phase fault protection.

SUMMARY

It is an object of the present invention to provide a universal, microprocessor-based recloser controller to operate three, single phase reclosers or one, three phase recloser.

It is another object of the present invention to employ an adaptive ground fault detection scheme that is capable of automatically adjusting itself to recognize gradual changes in current so as to avoid unnecessary phase tripping and service interruptions.

It is yet another object of the present invention to provide an adaptive scheme for detecting fault conditions as a function of an imbalance between the active phase current levels.

It is another object of the present invention to employ an adaptive phase fault detection scheme that is capable of automatically adjusting itself to recognize gradual changes in current for each individual phase so as to avoid unnecessary phase tripping and service interruptions.

In accordance with one aspect of the present invention, the foregoing and other objects are achieved by a method and/or an apparatus for adaptively detecting fault conditions comprising: generating a ground current vector; generating a ground offset vector; and determining whether a fault condition exists as a function of the ground current vector and the ground offset vector, wherein the ground offset vector tracks the ground current vector in accordance with a user adjustable time constant.

In accordance with another aspect of the present invention, the foregoing and other objects are achieved by a method and/or an apparatus for detecting fault conditions comprising: measuring a phase current vector for an active phase; generating a phase offset scaler for the active phase which periodically tracks the phase current vector as a function of a user adjustable time constant; generating a difference signal as a function of the phase current vector and the phase offset scalar; comparing the difference signal with the a phase minimum trip signal; and determining whether a fault condition exists as a function of the comparison between the difference signal and a phase minimum trip signal.

BRIEF DESCRIPTION OF THE DRAWINGS

The objects and advantages of the invention will be understood by reading the following detailed description in conjunction with the following drawings:

FIG. 1 is a flowchart illustrating the steps associated with the Adaptive Ground Fault Detection method in conjunction with the single phase trip, three phase lockout mode;

FIG. 4 is a flowchart illustrating the steps associated with the Adaptive Ground Fault Detection method and a single phase trip, three phase lockout mode with a loss of current capability;

FIG. 8 is a flowchart illustrating the steps associated with the Adaptive Ground Fault Detection method in conjunction with the three phase trip, three phase lockout mode using three single phase reclosers.

DETAILED DESCRIPTION

Figure 2:
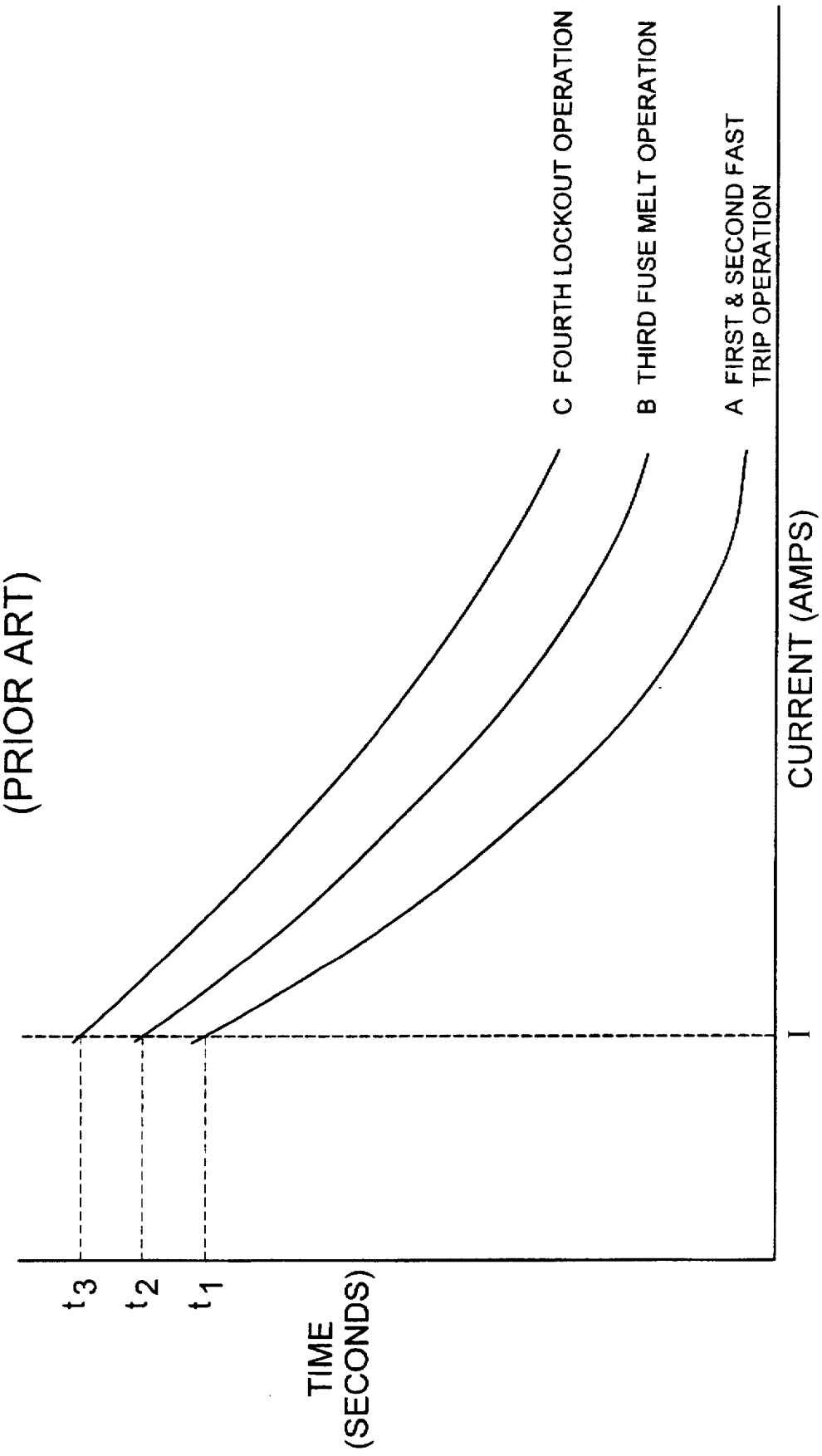
FIG. 2 depicts an exemplary set of time current curves.

The present invention relates to methods and apparatuses for adaptively protecting power distribution equipment. The adaptive fault protection schemes described herein, unlike the traditional (i.e., absolute) protection schemes, are capable of distinguishing between gradual changes in load current, due to normal, daily and/or seasonal fluctuations, versus sudden, more significant fluctuations due to potential fault conditions (e.g., downed powerlines and phase-to-phase faults). Consequently, the present invention provides a number of advantages not found in prior fault protection schemes.

First, the present invention minimizes power service interruptions for both single phase loads (e.g., residential customers) and three phase loads (e.g., industrial customers). In addition, the present invention is significantly more sensitive than traditional fault protection schemes and is thus more capable of detecting potential fault conditions distally located downline from the controller. Therefore, each controller provides fault protection over a greater area of the power distribution system. Moreover, the present invention can distinguish between the operation of an upline controller and a potential fault condition, thus preventing downline controllers from mis-operating. Finally, the present invention is more capable of recognizing a sudden loss of load current (or the sudden return of load current on a previously de-energized phase) and responding by locking out the device in the likely event that a conductor is on the ground and posing a safety hazard.

The present invention employs a universal, microprocessor-based recloser controller (herein referred to as a "controller") for implementing the adaptive ground and/or adaptive phase fault protection methods. The controller operates three single phase reclosers, each of three single phases of a three phase recloser, and/or all three phases of a three phase recloser. As stated, the controller is a universal device, which means that it can operate in various protection modes. For example, it can operate in a single phase trip, three phase lockout mode; a single phase trip, single phase lockout mode; a three phase trip, three phase lockout mode with three single phase reclosers; or a three phase trip, three phase lockout mode with one single three phase recloser.

In a first exemplary embodiment, the controller, employing adaptive ground fault detection, is operating in a single phase trip, three phase lockout mode. The controller detects fault conditions (e.g., overcurrent conditions) by deriving a Ground Current Vector (GCV) which reflects the relative balance or imbalance between the three single phase current vectors. One skilled in the art will understand that the GCV can be derived one of several ways. However, in the first exemplary embodiment, ground current is derived by summing the analog current values which develop across three separate phase current transformer burden resistors (i.e., there is one phase current transformer burden resistor for each phase). The summing function is performed by an operational amplifier circuit. The operational amplifier circuit output is then fed into an analog-to-digital converter. A microprocessor is then used to derive an RMS ground current value. The microprocessor is also used to derive phase angle. The phase angle is determined by comparing the negative and positive zero crossings of the sampled ground current to the negative and positive zero crossings for any one of the individual phase current signals. The RMS ground current value combined with the ground current phase angle determines the ground current vector (GCV).

In addition, the controller establishes an adaptive Ground Offset Vector (GOV). The GOV is considered adaptive because it tracks the value of the GCV in accordance with a user adjustable time constant, $T_c$. By periodically comparing the value of the GOV and the value of the GCV, the controller can distinguish gradual changes in load current (i.e., changes caused by daily or seasonal fluctuations), from sudden, more significant fluctuations caused by various overcurrent fault conditions. In the first exemplary embodiment, GOV is derived in accordance with the following relationship:

$$GOV_{new} = (GCV - GOV_{old})*(\Delta t/T_c + GOV_{old}) \quad (1)$$

wherein $\Delta t$ represents the time between updates, and Tc represents the value of the time constant. As GOV and GCV are both vector quantities, vector arithmetic is used to perform the computation. One skilled in the art will readily understand that the time required for the GOV to approximate the value of the GCV is a direct function of the value of $T_c$. Note, $T_c$ can be programmed to represent seconds or days depending upon the application. If the GCV value doesn't change for several time constants, the GOV will approach the GCV value, and eventually approximate it.

FIG. 1 depicts the method steps of the first exemplary embodiment. After initializing the GOV to zero, according to block 100, the GCV is determined by measuring and summing together the individual phase current vectors as explained above. This step is illustrated by block 105. The controller then determines the magnitude of the difference between the GCV and the GOV, where the GOV has begun tracking the value of the GCV in accordance with the user adjustable time constant as explained above. This step is illustrated by block 110. Since the value of the GOV tracks the value of the GCV, the difference between the GOV and the GCV should be relatively small if any fluctuations in phase current have been gradual. In contrast, the difference between the two values will be more significant if any one or more of the phase currents suddenly and substantially changes in response to an overcurrent fault condition, for example, a downed powerline or a phase-to-phase fault.

The next step involves determining whether the difference between the GCV and the GOV is relatively small or relatively large. The controller accomplishes this by comparing the difference between the value of the GCV and the value of the GOV with a variable called the Ground Minimum Trip (GMT) current, which is also predefined and programmed into the controller. This comparison is illustrated in block 115. As explained below, each phase has a corresponding, fixed and predefined phase minimum trip (PMT) value which is based upon the expected load current plus some predefined safety margin. The GMT value is also predefined and, as a rule of thumb, set equal to approximately one-half the PMT value. One skilled in the art will, however, understand that both the PMT and the GMT can be predefined to equal any number of effective values depending upon the application and expected load current.

If the difference between the value of the GCV and the value of the GOV is less than the GMT current, as indicated by the "NO" path out of decision block 120, the controller determines that there is presently no overcurrent fault condition that warrants tripping open any of the phase circuits. The controller then updates the GOV as a function of the GCV and the user adjustable time constant, as illustrated in block 122. The controller then repeats the aforementioned steps beginning with the determination of a new value for GCV, according to block 105.

If the difference between the value of the GCV and the value of the GOV is greater than or equal to the GMT current, as indicated by the "YES" path out of decision block 120, the controller identifies a potential overcurrent fault condition. The controller begins timing out the fault as a function of current and in accordance with a time current curve (TCC) (not shown). Before the fault timeout period expires, the controller continues to measure the GCV and compare it with the GOV as illustrated by the "NO" path out of decision block 125 and blocks 105 through 120. If a subsequent comparison between the GCV and the GOV indicates the overcurrent fault condition has been cleared, i.e., the difference value is less than the GMT value, the controller will terminate the fault timeout process and resume normal adaptive ground fault detection in accordance with the "NO" path out of decision block 120. If, however, the overcurrent fault condition does not clear itself before the fault timeout period expires, as illustrated by the "YES" path out of decision block 125, the controller will trip open the phase(s) affected by the overcurrent fault.

The controller trips open the affected phase(s) by first analyzing each phase to determine whether the magnitude of the corresponding phase current vector has exceeded a predefined and preprogrammed Phase Minimum Trip (PMT) current, as illustrated by block 135. If none of the phase current vector magnitudes exceed the PMT current, the controller will identify the phase whose current has changed most significantly. For each phase whose current exceeds the PMT current, or for the phase whose current has changed most significantly, the controller issues a single phase trip signal, which causes the corresponding recloser to open, as illustrated by block 140. The controller simultaneously stores the value of the GOV in memory.

By tripping open only the recloser(s) associated with the phase(s) affected by the potential overcurrent fault condition, this system is capable of continuously providing power and adaptive ground fault protection for customers connected to the unaffected phase(s), as illustrated by block 155. The controller accomplishes this by determining a new value for the GCV, by summing the phase current vectors for the unaffected phases, and a new value for the GOV, which is initially set equal to the GCV.

The controller is programmed to trip open a given recloser a preset number of times (e.g., four times). This number is referred to as the "operation to lockout limit." If the number of times the controller has tripped open the affected recloser (s) is equal to the "operations to lockout limit", as indicated by the "YES" path out of decision block 160, the controller will generate three individual signals to permanently lockout all three phases, as illustrated by block 190, and in accordance with the single phase trip, three phase lockout mode. Typically, the controller will be programmed with a 1, 2, 3 or 4 operation(s) to lockout limit.

However, if the number of times the controller has tripped open the affected recloser(s) is not equal to the operations to lockout limit, as indicated by the "NO" path out of decision block 160, the controller will close the affected reclosers after a preset reclose period has expired, as illustrated by block 170. The controller then restores the value of the GOV, which was previously stored in memory, as illustrated by block 180. The reason the GOV value was previously stored and then subsequently restored is because a temporary value for the GOV equal to a temporary GCV value, based on less than all three phase current vectors, is computed to support adaptive fault detection on the unaffected phase(s) during the trip/reclose period as described above. After restoring the value of the GOV, the controller determines a new value for the GCV based on all three phase current vectors so as to establish whether the overcurrent fault condition cleared itself during the trip/recloser period. Of course, if the fault condition has not yet cleared itself, the controller will eventually trip open the affected recloser(s). This process repeats itself until the fault condition has cleared itself or until the "operations to lockout limit" has been reached, after which, the controller will permanently lockout all three phases as previously explained.

The advantage of the single phase trip, three phase lockout mode is that only the affected phases are tripped open during the trip/reclose operations. Since the vast majority of potential fault conditions are temporary (i.e., will clear themselves or be cleared by temporarily de-energizing the circuit before the condition can cause any damage), this method substantially reduces the number of momentary power interruptions for both three phase and single phase customers.

As stated, the controller will initiate one or more trip/reclose operations for the appropriate recloser(s) if the controller detects a potential fault condition. It was also previously stated that the recloser(s) is tripped open in accordance with a set of TCCs. TCCs are generally well known in the art; however, the use of TCCs will be described in greater detail hereinbelow.

An exemplary set of TCCs is illustrated in FIG. 2. In FIG. 2, the vertical axis represents time, more specifically, the time from fault detection to trip as illustrated by block 125 in FIG. 1. For example, after a potential overcurrent fault is detected using the GMT current, the controller will initiate a first "fast" trip operation (i.e., open the affected recloser(s)) after the expiration of a first trip interval $t_1$, in accordance with a curve A and a specific overcurrent value I. If the controller is operating in a single operation-to-lockout mode, the controller will lockout all three phases after the expiration of the first trip interval $t_1$, as explained above. Although the controller can be programmed to execute any number of trip/recloser operations before locking out the phase(s), the controller can, for example, be programmed to execute four trip/reclose operations (i.e., four operations-to-lockout). Therefore, if the controller is not operating in a single operation-to-lockout mode, but instead is programmed for four operations-to-lockout, the controller will reclose the affected recloser(s) after the expiration of a preset reclose interval which typically ranges from 0.5 to 2 seconds. The controller then uses all three phase current vectors, the GCV, the GOV, the GMT, and the adaptive ground fault detection method of the present invention to determine if the overcurrent fault condition has been cleared. If not, the controller will initiate a second "fast" trip/reclose operation again in accordance with curve A and trip interval $t_1$. Once again, the controller will reclose the affected recloser(s) after the expiration of a preset reclose interval. If the fault condition still has not been cleared after the two "fast" trip/reclose operations, the controller will initiate a third trip operation, in accordance with curve C and a trip interval $t_3$, the purpose of which is to melt an inline fuse (see FIG. 3), wherein $t_2$ represents the time required to melt a typical inline fuse given current I. Note, trip interval $t_2$ is greater than $t_1$, and trip interval $t_3$ is greater than $t_2$, wherein $t_3$ is just long enough to allow a typical inline fuse to melt. If for any reason the inline fuse does not melt, or there are no inline fuses, the controller will close the affected recloser (s), then determine whether the fault has been cleared. If the fault still has not been cleared, the controller will initiate a fourth and final trip operation, again, in accordance with curve C and trip interval $t_3$. If, by the expiration of $t_3$, the fault has not been cleared and the inline fuse has not melted, the controller will lock out all three phases.

It is important to note that many different families of TCCs can be programmed into the controller. Different TCCs would be needed depending upon the power source(s) reclosers, alternative protection components (e.g., fuses), whether single phase tripping is employed or three phase tripping, and whether single phase or three phase lockout is employed. However, when specifically operating in a single phase trip, three phase lockout mode, the controller will apply the same set of TCCs for all three phases.

Figure 3:
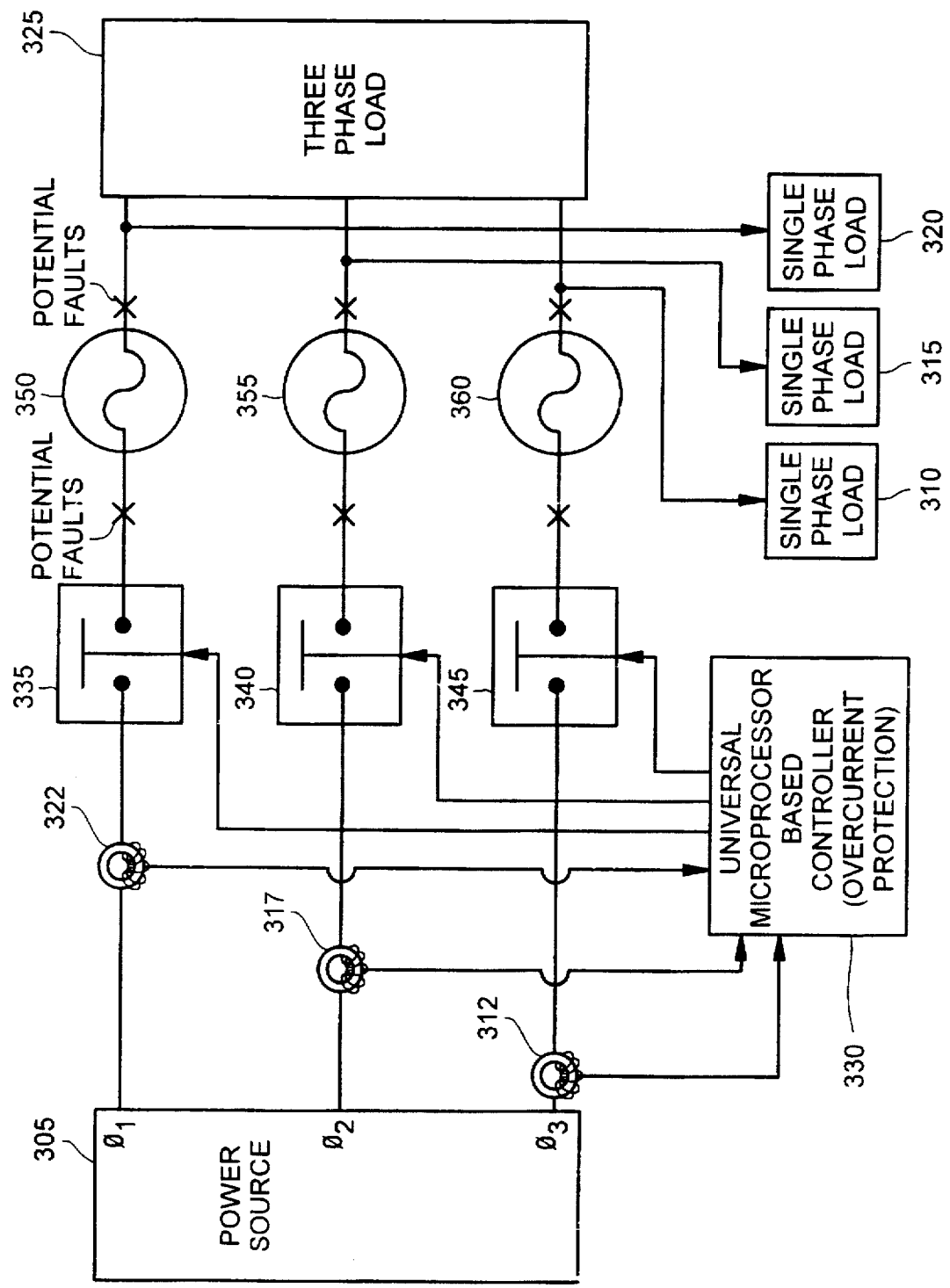
FIG. 3 is a block diagram of a three phase power distribution system employing three single phase reclosers with a universal, microprocessor-based recloser controller.

FIG. 3 illustrates a block diagram of a three phase power distribution system that distributes power from a three phase power source 305 (e.g., a transformer) to various single phase loads 310, 315, and 320 (e.g., residential customers) and various three phase loads (e.g., industrial customers), as illustrated by three phase load 325. The three individual phases are represented by powerlines $\phi_1$, $\phi_2$ and $\phi_3$ respectively. Current transformers, e.g., 312, 317, and 322, would also be employed to provide feedback information to the controller 330 regarding the phase current vector values. The microprocessor-based recloser controller 330 detects fault conditions as described above and directly controls the trip/reclose operations for each of the three single phase reclosers 335, 340, and 345 individually, or, in the alternative, as will be explained in greater detail below, all three phases simultaneously. The protective scheme may also include inline fuses downline from the reclosers as illustrated by fuses 350, 355, and 360. Of course, one skilled in the art will understand that the various steps of the first exemplary method described above could be programmed into the microprocessor-based recloser controller 330 using well known programming methods and techniques.

Some fault conditions are so hazardous that they warrant an immediate lockout of all three phases after the first trip operation. An example of an extremely hazardous condition that might warrant such action is a complete loss of current due to a downed powerline. FIG. 4 illustrates this alternative approach to the first exemplary embodiment. This alternative method is referred to as the single phase trip, three phase lockout mode with loss of current capability.

As in the first exemplary method described above, the controller first initializes the value of the GOV to zero, as illustrated by block 400; determines a new value for the GCV by measuring and summing the individual phase current vectors, as illustrated by block 405; determines the difference value between the GCV with the GOV, as illustrated by block 410; and compares the difference to a GMT current, as illustrated in block 415. If the difference between the value of the GOV and the value of the GCV is not greater than or equal to the GMT current, as indicated by the "NO" path out of decision block 420, the controller determines that there are no potential overcurrent fault conditions. The controller then adaptively adjusts the GOV as a function of the GCV and a user adjustable time constant, as explained above. The controller then repeats the aforementioned steps. Again, since the value of the GOV tracks the value of the GCV in accordance with the user adjustable time constant, the difference between the GOV and the GCV should remain relatively small unless there are significant fluctuations in live current due to a fault condition. However, if the difference between the value of the GOV and the value of the GCV is greater than or equal to the GMT current, as indicated by the "YES" path out of decision block 420, the controller begins timing the fault in accordance with a corresponding TCC. Until the trip interval has expired, the controller will continue to execute the aforementioned steps, in accordance with the "NO" path out of decision block 420, to determine whether the fault condition has been cleared. If the trip interval expires and the fault condition has not cleared, in accordance with the "YES" path out of decision block 420, the controller will, as in the exemplary embodiment described above, determine which phases are affected by the fault condition, store the present value of the GOV, and generate the appropriate trip signal(s) to open the corresponding recloser(s), as illustrated by blocks 435 and 440. The controller will then determine whether a condition indicative of a downed powerline exists by establishing whether the current for the affected phase(s) has dropped by an amount in excess of a second Phase Minimum Trip signal, but not to zero, as illustrated by decision block 430. This second phase minimum trip signal is different from the phase minimum trip signals described above. If the potentially hazardous condition does exist, the controller will inhibit additional trip/reclose operations and immediately lockout all three phases in accordance with block 440 and the "YES" path out of decision block 430. If the controller determines that the potentially hazardous condition does not exist, normal trip/reclose operations will continue as described in the first preferred embodiment.

As stated above, a significant loss of current on one or more of the individual phases may be an indication of a potentially hazardous condition warranting a single trip operation followed by immediate lockout. If instead inline voltage sensors detect a sudden loss of voltage or a sudden return of voltage, this may indicate that an upline device (i.e., a recloser) has responded to a potential fault condition. When an upline condition results in de-energizing one or two phases the resulting phase imbalance should not cause the downline controller to issue a trip signal.

Figure 5C:
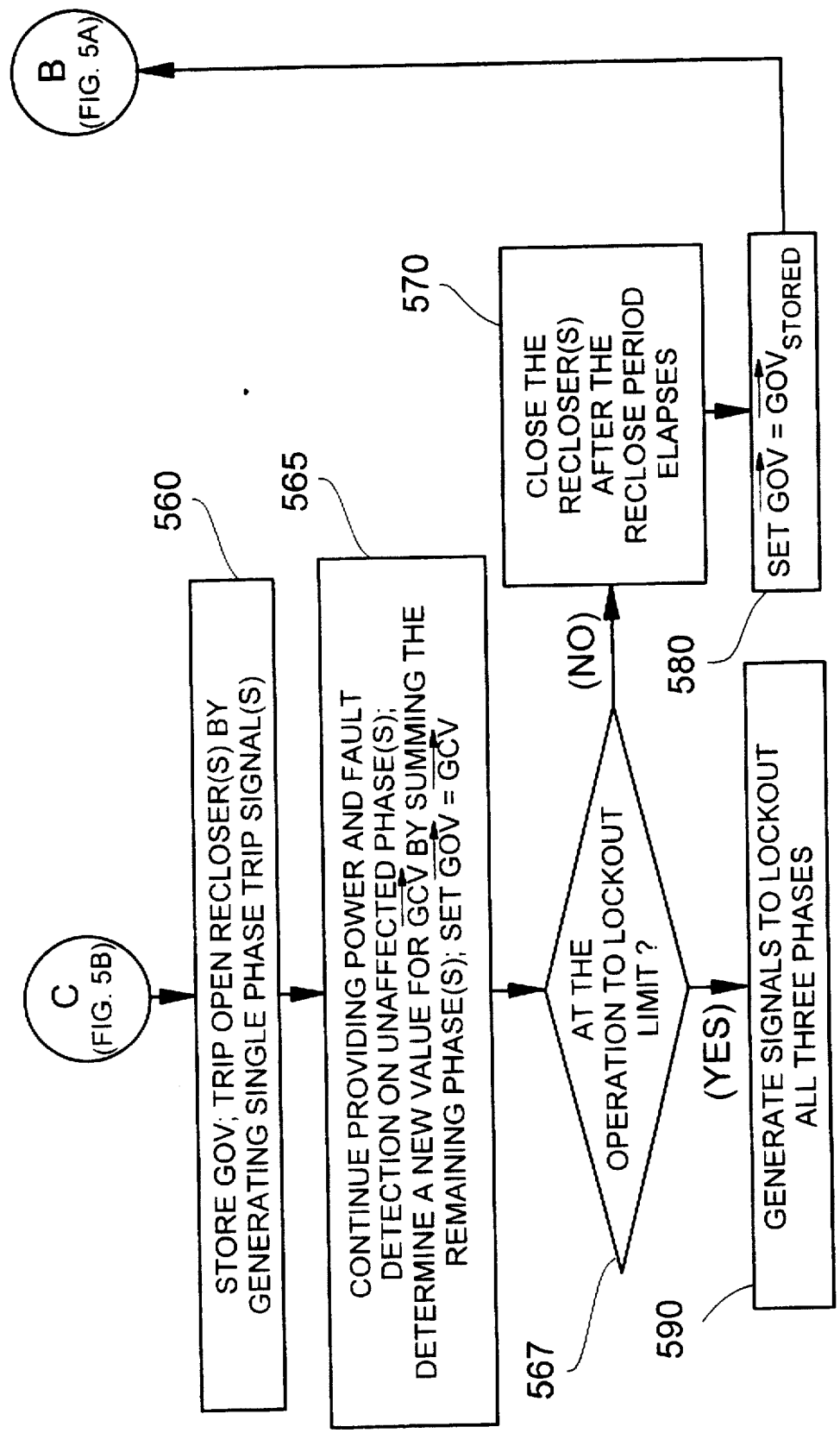
FIG. 5 is a flowchart illustrating the steps associated with the Adaptive Ground Fault Detection method and a single phase trip, three phase lockout mode with a zero current, zero voltage trip inhibit capability.

FIG. 5, therefore, illustrates a second alternative approach to the first exemplary embodiment. This second alternative approach is designed to specifically respond to the above-mentioned condition by inhibiting the trip/reclose operation. This alternative method is appropriately referred to as the zero voltage trip inhibit method. As in the first exemplary embodiment, the adaptive ground fault detection method, including the GCV, the GOV, the user adjustable time constant, and the GMT, are employed to determine whether a potential fault condition exists on one or more of the individual phases, as illustrated in blocks 500 through 522. Unlike the first exemplary embodiment, if a fault is detected in accordance with the "YES" path out of decision block 520, voltage sensors are employed to establish the voltage levels on each phase. If, within a predefined time period, beginning with the detection of an imbalance between the GCV and the GOV, the voltage sensors determine that there has been a sudden loss of voltage on a previously energized phase or voltage has returned on a previously de-energized phase, as indicated by the "YES" path out of decision block 530, the controller responds as if an upline recloser has responded to the potential fault condition. More specifically, the controller responds by determining a new value for the GCV based on the remaining active phase(s), as illustrated by block 545, and a new value for the GOV which is initialized to the value of the GCV, as illustrated by block 547. The controller then continues to provide adaptive ground fault protection for the unaffected phase(s).

If the controller instead determines that there has been no sudden loss or return of voltage on any of the phases, as indicated by the "NO" path out of decision block 530, the controller will provide normal trip/reclose operations as described in the first exemplary embodiment above and as illustrated by blocks 550 through 590. Thus, the zero current, zero voltage trip inhibit method avoids tripping due to the opening of an upline device.

In another exemplary embodiment, the controller may be operating in a single phase trip/single phase lockout mode. This mode is suited, as one skilled in the art will understand, for a system configuration that is servicing predominantly single phase loads. Unlike the Adaptive Ground Fault Detection scheme of the first exemplary embodiment, which summed three individual phase current vectors, the Adaptive Phase Fault Detection scheme of this exemplary embodiment uses individual phase current vectors. As such, the universal controller operates on each of the three single phase reclosers independently. Furthermore, the controller can maintain separate and distinct TCCs for each phase. And, the controller can, unlike the first exemplary embodiment, lockout each phase individually; therefore, even after lockout, power may continue to be supplied to customers connected to the unaffected phases.

Figure 6A:
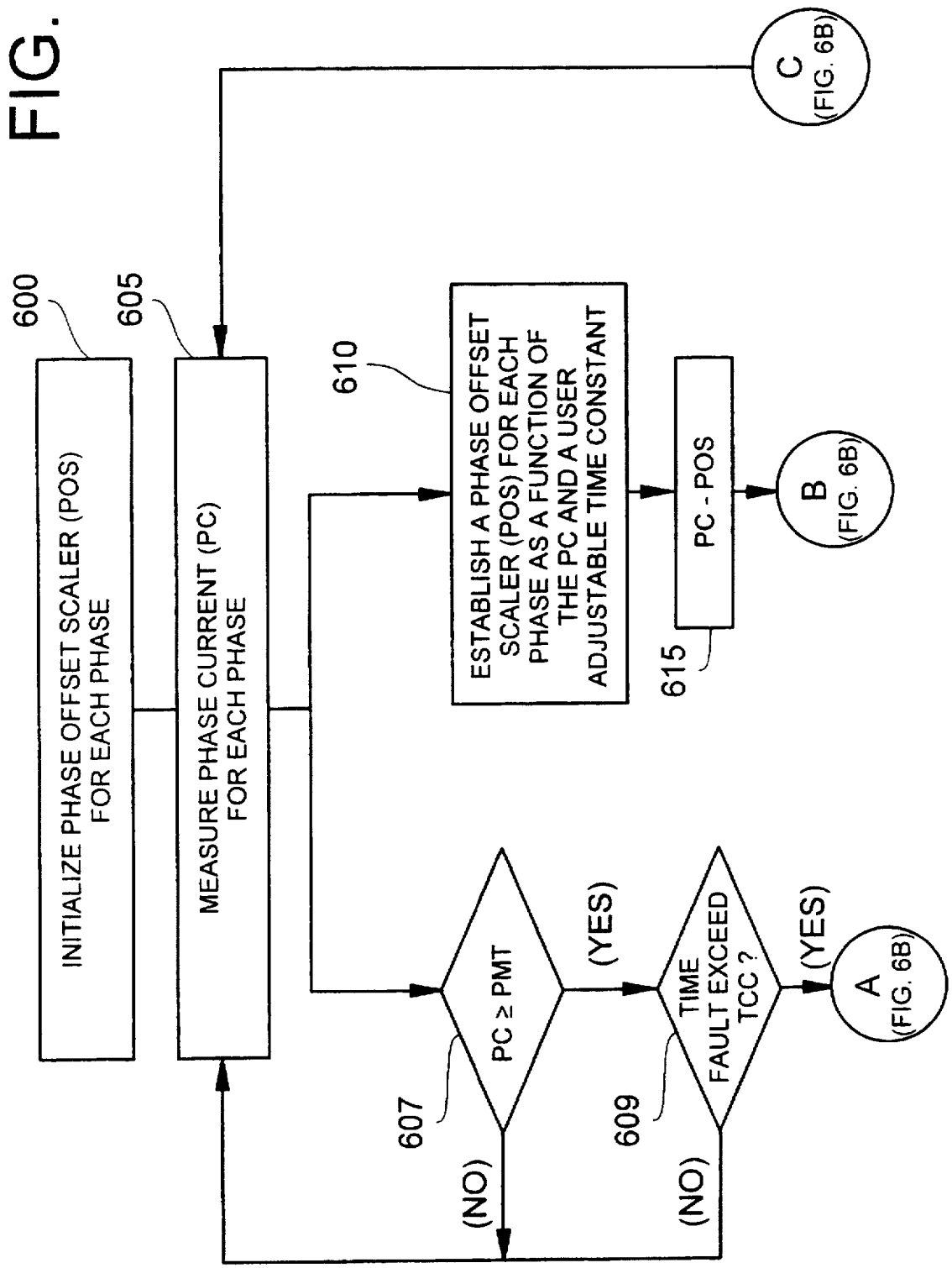
FIG. 6 is a flowchart illustrating the steps associated with the Adaptive Phase Fault Detection method in conjunction with the single phase trip, single phase lockout mode.
Figure 6B:
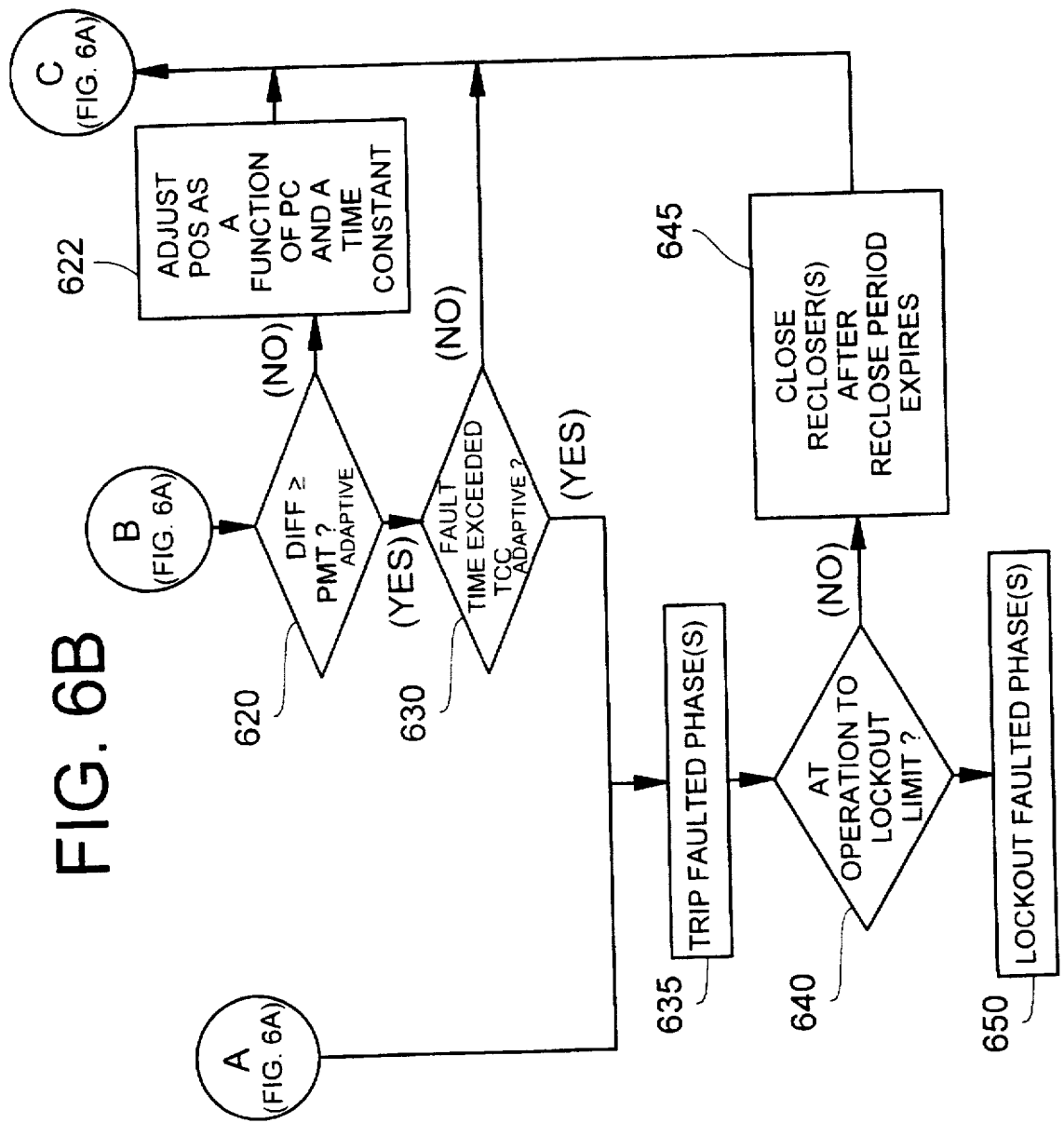

FIG. 6 illustrates the method steps for implementing this exemplary embodiment. The controller first initializes a phase offset scalar (POS), as illustrated by block 600, which is analogous to the GOV described above with respect to the first exemplary embodiment. The controller then measures the phase current (PC) for each individual phase, as illustrated by block 605. Note, the controller can execute these steps for all 3 phases substantially simultaneously and independently. The controller can then provide adaptive phase fault protection in accordance with the present invention by regenerating the POS, as illustrated by block 610, as a function of the corresponding PC and a user adjustable time constant, where the method for deriving the POS is the same as the method described above for deriving the GOV, but for the derivation of the POS is a scaler operation rather than a vector operation. The controller then compares the value of the POS and the value of the PC, as illustrated by block 615. The controller determines whether the difference between the PC and the POS is significant by comparing the difference to an adaptive PMT current, as illustrated by decision block 620.

If the difference is not greater than or equal to the adaptive PMT current, as indicated by the "NO" path out of decision block 620, the controller determines that no phase fault condition exists. It then updates the value of the POS as a function of the corresponding PC value and the user adjustable time constant, as illustrated by block 622. The controller then repeats the aforementioned method steps. By allowing the value of the POS to track the value of the PC, the difference between the PC and the POS should remain relatively small as PC gradually changes in response to daily or seasonal fluctuations. If, however, the difference between the POS and the PC is greater than or equal to the adaptive PMT current, as indicated by the "YES" path out of decision block 620, the controller will initiate one or more trip/reclose operations in accordance with the corresponding set(s) of TCCs, as illustrated by blocks 630 through 645, and if necessary, lockout the phase(s) affected by the overcurrent fault condition, as illustrated by block 650.

Alternatively, the controller may employ both an adaptive single phase trip scheme as described above and a conventional phase trip scheme, as illustrated by blocks 607 and 609. Conventional phase tripping refers to the method of tripping open an individual phase(s) when the corresponding phase current exceeds some predefined fixed value.

Figure 7:
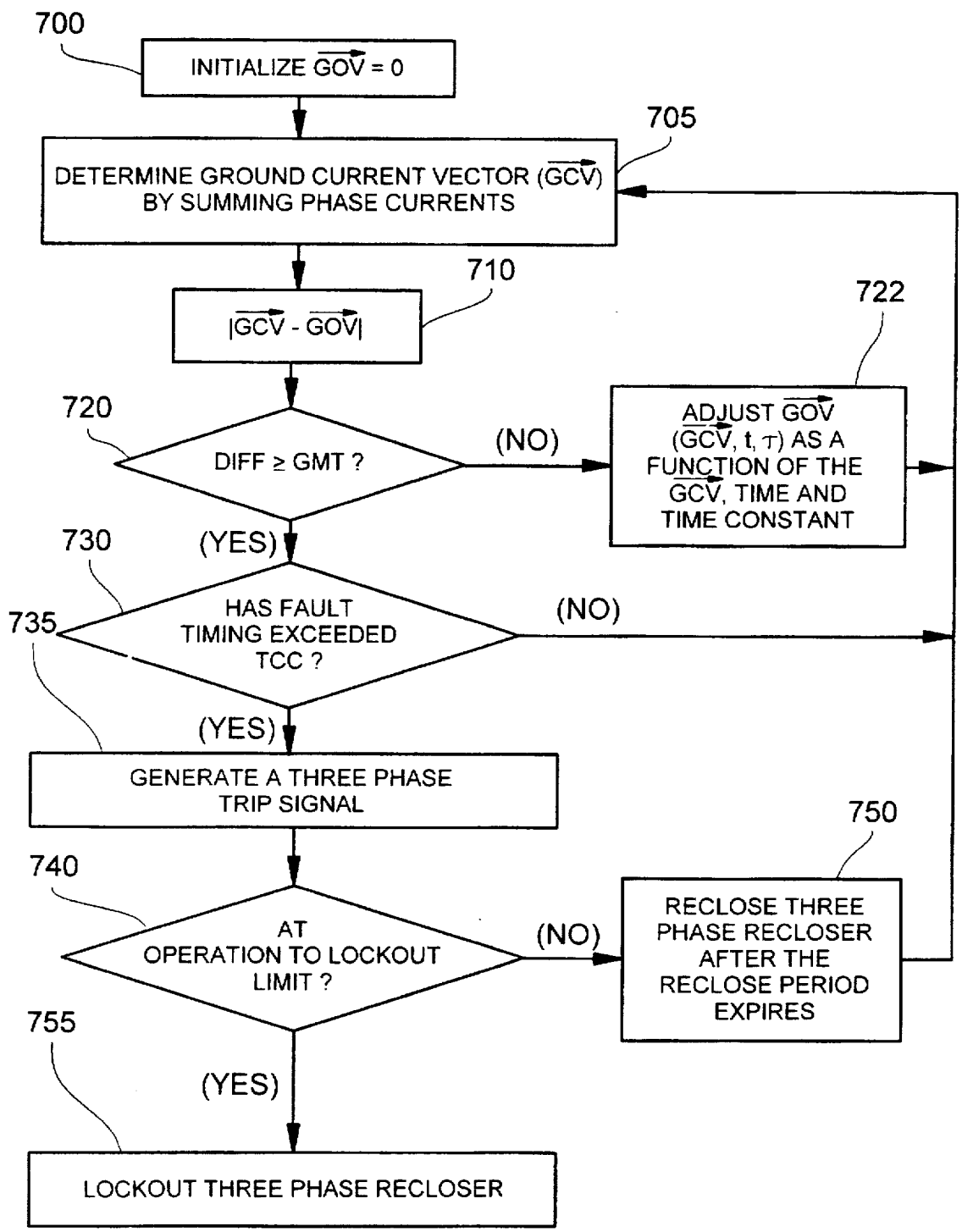
FIG. 7 is a flowchart illustrating the steps associated with the Adaptive Ground Fault Detection method in conjunction with the three phase trip, three phase lockout mode using one single three phase recloser.

In yet another exemplary embodiment, the controller is programmed to operate in a three phase trip/three phase lockout mode with a single three phase recloser. This mode will be utilized when the system configuration is servicing predominantly three phase loads. FIG. 7 illustrates the method steps for executing this exemplary embodiment. FIG. 7 also illustrates that this exemplary embodiment and the first exemplary embodiment are similar in that both methods employ the Adaptive Ground Fault Detection scheme based upon a GCV, a GOV, and a user adjustable time constant. Consequently, blocks 700 through 730 are identical to blocks 100 through 125 (see FIG. 1). If, however, the fault condition has not been cleared before the expiration of the trip interval, as indicated by the "YES" path out of decision block 730, the controller will generate a three phase trip signal, rather than one or more single phase trip signals, as illustrated by block 735. Unlike the first exemplary embodiment, there is no need for the controller to determine which phase caused the fault; therefore, there is no need to determine whether any individual phase(s) exhibit excessively large or excessively low current levels.

The controller then determines if the maximum number of trip operations have been executed, as illustrated by decision block 740. If the maximum number of trip operations have been executed, as illustrated by the "YES" path out of decision block 740, the controller will proceed to lockout the three phase recloser as illustrated by block 755. If the maximum number of trip operations have not been executed, as illustrated by the "NO" path out of decision block 740, the controller will reclose the three phase recloser after a preset reclose period expires, as illustrated by block 750. The controller, as in the first exemplary embodiment, will then repeat the aforementioned method steps until the fault condition clears itself or the maximum number of trip operations have been executed.

Unlike the first exemplary embodiment, all service is interrupted when the controller trips open the three phase recloser. However, utilization of the adaptive ground fault detection scheme still reduces the overall number of service interruptions compared to prior methods because the controller will not trip the three phase recloser in response to gradual line current fluctuations, as explained above.

In still another exemplary embodiment, the controller is programmed to operate in a three phase trip/three phase lockout mode with three single phase reclosers. FIG. 8 illustrates the method steps for this exemplary embodiment. Note, the method steps are similar to those illustrated in FIG. 7, but for, the controller generates three single phase trip signals, as illustrated by block 835, after the controller detects a potential fault and the trip interval expires as illustrated by decision block 830. In addition, the controller will lockout all three single phase reclosers simultaneously after the maximum number of trip operations have been executed, as illustrated by block 855 and the "YES" path out of decision block 840.

The purpose for providing this capability is to insure that the controller can perform either three phase trip, single phase trip, three phase lockout, or single phase lockout when the system configuration includes single phase reclosers. A system operator will be able to select whether the controller actually performs single phase or three phase operations, based on the needs of the operating environment.

Several exemplary embodiments employing the adaptive ground fault protection and/or an adaptive phase fault protection scheme have been described herein-above. One skilled in the art will readily understand that a single controller may be programmed to provide any two or more of the aforementioned embodiments combined. One skilled in the art will also readily understand that a single controller may provide both adaptive ground and adaptive phase fault protection, as well as adaptive and traditional (i.e., absolute) fault protection.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. In a power distribution system, a method of detecting fault conditions comprising the steps of:
   generating a ground current vector;
   generating a ground offset vector; and
   determining whether a fault condition exists based on the ground current vector and the ground offset vector,
   wherein the ground offset vector tracks the ground current vector in accordance with a user adjustable time constant.

2. A method in accordance with claim 1, wherein said step of determining whether a fault condition exists based on the ground current vector and the ground offset vector comprises the steps of:
   generating a difference value between the ground current vector and the ground offset vector;
   generating a ground minimum trip signal;
   comparing the difference value with the ground minimum trip value; and
   determining whether a fault condition exists based on the comparison between the ground minimum trip signal and the difference value,
   wherein the ground minimum trip signal represents a maximum allowable departure for the difference value.

3. A method in accordance with claim 1, further comprising the steps of:
   measuring a phase current vector for each active phase;
   determining whether the phase current vector for each active phase exceeds a phase minimum trip signal;
   generating a single phase trip signal for each active phase if the corresponding phase current vector exceeds the phase minimum trip signal; and
   generating three single phase lockout signals to lockout all phases if the fault condition fails to clear itself after a predefined number of tripping operations have been executed.

4. A method in accordance with claim 3, further comprising the step of:
   bypassing additional tripping operations, if any, and immediately locking out all phases, if the phase current vector for any of the active phases has a non-zero magnitude that has decreased by an amount that exceeds a second phase minimum trip signal.

5. A method in accordance with claim 1, further comprising the steps of:

measuring a voltage value for a phase, if a fault condition is detected;
inhibiting a tripping operation on the measured phase if the measured voltage value decreased to zero from a previously energized state; and
inhibiting a tripping operation on the phase if the measured voltage value increases to a non-zero value from a previously de-energized state.

6. A method in accordance with claim 1, further comprising the steps of:
   generating a three phase trip signal if a fault condition is detected; and
   generating a three phase lockout signal to lockout all three phases if the fault condition fails to clear itself after a predefined number of tripping operations have been executed.

7. A method in accordance with claim 1, further comprising the steps of:
   generating three single phase trip signals if a fault condition is detected; and
   generating three lockout signals to lockout all three phases if the fault condition fails to clear itself after a predefined number of tripping operations have been executed.

8. In a three phase power distribution system, a method of detecting fault conditions comprising the steps of:
   measuring a phase current vector for an active phase;
   generating a phase offset scalar for the active phase which periodically tracks the phase current vector as a function of a user adjustable time constant;
   generating a difference signal between the phase current vector and the phase offset scalar;
   comparing the difference signal with a phase minimum trip signal; and
   determining whether a fault condition exists based on the comparison between the difference signal and a phase minimum trip signal.

9. A method in accordance with claim 8, further comprising the steps of:
   generating a single phase trip signal if a fault condition is detected on an active phase; and
   generating a single phase lockout signal if the fault condition remains after a predefined number of single phase tripping operations have been executed.

10. In a power distribution system, an apparatus for adaptively detecting fault conditions comprising:
    means for generating a ground current vector;
    means for generating a ground offset vector; and
    means for determining whether a fault condition exists as a function of the ground current vector and the ground offset vector,
    wherein the ground offset vector tracks the ground current vector in accordance with a user adjustable time constant.

11. An apparatus in accordance with claim 10, wherein said means for determining whether a fault condition exists as a function of the ground current vector and the ground offset vector comprises:
    means for generating a difference value as a function of the ground current vector and the ground offset vector;
    means for generating a ground minimum trip signal;
    means for comparing the difference value with the ground minimum trip value; and means for determining whether a fault condition exists as a function of the comparison between the ground minimum trip signal and the difference value, wherein the ground minimum trip signal represents a maximum allowable departure for the difference value.

12. An apparatus in accordance with claim 10, further comprising:

means for measuring a phase current vector for each active phase if a fault condition is detected;

means for determining whether the phase current vector for each active phase exceeds a phase minimum trip signal;

means for generating a single phase trip signal for each active phase if the corresponding phase current vector exceeds the phase minimum trip signal; and means for generating three single phase lockout signals to permanently lockout all phases if the fault condition fails to clear itself after a predefined number of tripping operations have been executed.

13. An apparatus in accordance with claim 12, further comprising:

means for bypassing additional tripping operations, if any, and immediately locking out all phases, if the phase current vector for any of the active phases has a non-zero magnitude that has decreased by an amount that exceeds a second phase minimum trip signal.

14. An apparatus in accordance with claim 10, further comprising:

means for measuring a voltage value for a phase, if a fault condition is detected;

means for inhibiting a tripping operation on the phase if the measured voltage value decreased to zero from a previously energized state; and means for inhibiting a tripping operation on the phase if the measured voltage value increases to a non-zero value from a previously de-energized state.

15. An apparatus in accordance with claim 10, further comprising:

means for generating a three phase trip signal if a fault condition is detected; and means for generating a three phase lockout signal to permanently lockout all three phases if the fault condition fails to clear itself after a predefined number of tripping operations have been executed.

16. An apparatus in accordance with claim 10, further comprising:

means for generating three single phase trip signals if a fault condition is detected; and means for generating three lockout signals simultaneously to permanently lockout all three phases if the fault condition fails to clear itself after a predefined number of tripping operations have been executed.

17. In a three phase power distribution system, an apparatus for detecting fault conditions comprising:

means for measuring a phase current vector for an active phase;

means for generating a phase offset scalar for the active phase which periodically tracks the phase current vector as a function of a user adjustable time constant;

means for generating a difference signal as a function of the phase current vector and the phase offset scalar;

means for comparing the difference signal with a phase minimum trip signal; and means for determining whether a fault condition exists as a function of the comparison between the difference signal and a phase minimum trip signal.

18. An apparatus in accordance with claim 17, further comprising:

means for generating a single phase trip signal if a fault condition is detected on an active phase; and means for generating a single phase lockout signal if the fault condition fails to clear itself after a predefined number of single phase tripping operations have been executed.

* * * * *